US010990417B2

United States Patent
Zhao et al.

(10) Patent No.: US 10,990,417 B2
(45) Date of Patent: Apr. 27, 2021

(54) METHOD AND SYSTEM FOR CONNECTING USERS BASED ON A MEASURE OF CORRELATION

(75) Inventors: Ling Zhi Zhao, Shanghai (CN); Fu Guo Lu, Shanghai (CN); Fan Mei, Shanghai (CN); Leslie Scott Ruskin, Shanghai (CN); Yi Sun, Shanghai (CN); Zhi Gang Yang, Shanghai (CN); Xiao Bing Wang, Shanghai (CN); Qiang Wu, Shanghai (CN); Xuan Yi Li, Shanghai (CN)

(73) Assignee: AUTODESK, INC., San Rafael, CA (US)

(*) Notice: Subject to any disclaimer, the term of this patent is extended or adjusted under 35 U.S.C. 154(b) by 816 days.

(21) Appl. No.: 13/599,976

(22) Filed: Aug. 30, 2012

(65) Prior Publication Data

US 2014/0068086 A1    Mar. 6, 2014

(51) Int. Cl.
*G06F 9/451* (2018.01)
*G06Q 30/02* (2012.01)
*G06F 15/163* (2006.01)

(52) U.S. Cl.
CPC ............ *G06F 9/451* (2018.02); *G06F 15/163* (2013.01); *G06Q 30/02* (2013.01)

(58) Field of Classification Search
CPC . G06Q 30/02; G06F 17/3064; G06F 17/3053; G06F 15/163; G06F 9/4443
See application file for complete search history.

(56) References Cited

U.S. PATENT DOCUMENTS

| | | | | |
|---|---|---|---|---|
| 2006/0256959 A1* | 11/2006 | Hymes | ................... | H04M 1/26 379/433.04 |
| 2007/0180101 A1* | 8/2007 | Chen et al. | ................... | 709/224 |
| 2007/0244868 A1* | 10/2007 | Grubb et al. | ..................... | 707/3 |
| 2007/0255785 A1* | 11/2007 | Hayashi et al. | .............. | 709/204 |
| 2009/0112985 A1* | 4/2009 | Quinn et al. | ................... | 709/204 |
| 2011/0099475 A1* | 4/2011 | Grossman | ............ | G06F 9/4446 715/709 |
| 2011/0161425 A1* | 6/2011 | Xiao | ................... | G06F 16/2358 709/206 |
| 2011/0179149 A1* | 7/2011 | Kazan | ................... | G06F 9/4451 709/221 |
| 2011/0208822 A1* | 8/2011 | Rathod | .................. | G06Q 30/02 709/206 |
| 2012/0041907 A1* | 2/2012 | Wang et al. | .................... | 706/12 |
| 2012/0047150 A1* | 2/2012 | Spiegel | ........................ | 707/748 |

* cited by examiner

*Primary Examiner* — Philip J Chea
*Assistant Examiner* — Mohammed Ahmed
(74) *Attorney, Agent, or Firm* — Artegis Law Group, LLP

(57) ABSTRACT

One embodiment of the present invention sets forth a technique for connecting users based on a measure of correlation. The method involves receiving a first activity data element associated with a first user, where the first activity data element includes activity information related to a first software application, receiving a second activity data element associated with a second user, where the second activity data element includes activity information related to the first software application, and determining, via a processing unit, a measure of correlation between the first and second activity data elements. The method further involves determining, based on the measure of correlation between the first and second activity data elements, that a connection between the first user and the second user should be facilitated, and facilitating a connection between the first user and the second user.

21 Claims, 6 Drawing Sheets

METHOD AND SYSTEM FOR CONNECTING USERS BASED ON A MEASURE OF CORRELATION

BACKGROUND OF THE INVENTION

Field of the Invention

The present invention generally relates to computer software, and, more specifically, to a method and system for connecting users based on a measure of correlation.

Description of the Related Art

A wide variety of software applications are currently available to end-users, including computer-aided design (CAD) applications, computer graphics applications, animation applications, word processing applications, and computer programming applications, among others. Many of these software applications allow an end-user to interact with the software application via a graphical end-user interface (GUI). Conventional GUIs often provide the end-user with access to a set of tools that can be used to perform various operations within a workspace generated by the software application. For example, a CAD application could provide a set of drawing tools that could be used to draw different shapes within a drawing workspace generated by the CAD application. Each tool in the set of tools may be represented within the GUI with an icon that the end-user could select in order to use the tool.

Despite advances in enabling end-users to more easily operate complex applications, learning how to use such applications can still be problematic. More complex applications, for example, the CAD application described above, often include thousands of commands or functions from which to choose, and many ways for an end-user to combine these functions into workflows. Consequently, when using an unfamiliar area of such an application, even expert end-users may require assistance.

Conventionally, software applications provide the end-user with instructional information that assists in using various commands and functions associated with the software application. For example, the software application may include a "help" database that receives a query from the end-user and then identifies articles that relate to the received query. Those articles may then be displayed to the end-user.

One problem with conventional help databases is that such databases may provide insufficient details regarding the use of an application tool. For example, articles within a help database typically provide only general instruction regarding application functions and often fail to address the unique circumstances under which an end-user seeks to use a particular tool. Consequently, despite having reviewed the help article, the end-user may still have difficulty understanding how to use a tool to accomplish a specific task, or how the tool may interact with other aspects that are unique to that end-user's workflow. Another problem with conventional help databases is that, since many help databases use a "pull" model that relies on explicit requests for information made by the end-user, the end-user often must have a certain degree of knowledge regarding a particular command or function in order to effectively query the database. Thus, end-users who are inexperienced with or entirely unaware of a particular aspect of an application may be unable to locate useful articles within the help database. Therefore, the end-user must stop working in order to seek out additional help resources, resulting in decreased productivity.

As the foregoing illustrates, there is a need in the art for a more effective way to provide end-users of an application with instructional information related to the application.

SUMMARY OF THE INVENTION

One embodiment of the present invention sets forth a method for facilitating a connection between users based on a measure of correlation. The method involves receiving a first activity data element associated with a first user, where the first activity data element includes activity information related to a first software application, receiving a second activity data element associated with a second user, where the second activity data element includes activity information related to the first software application, and determining, via a processing unit, a measure of correlation between the first and second activity data elements. The method further involves determining, based on the measure of correlation between the first and second activity data elements, that a connection between the first user and the second user should be facilitated, and facilitating a connection between the first user and the second user.

Further embodiments provide a non-transitory computer-readable medium and a computing device to carry out the method set forth above.

Advantageously, the disclosed technique facilitates communication and collaboration between users by enabling one or more users to provide immediate, context-specific assistance regarding a particular application tool.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
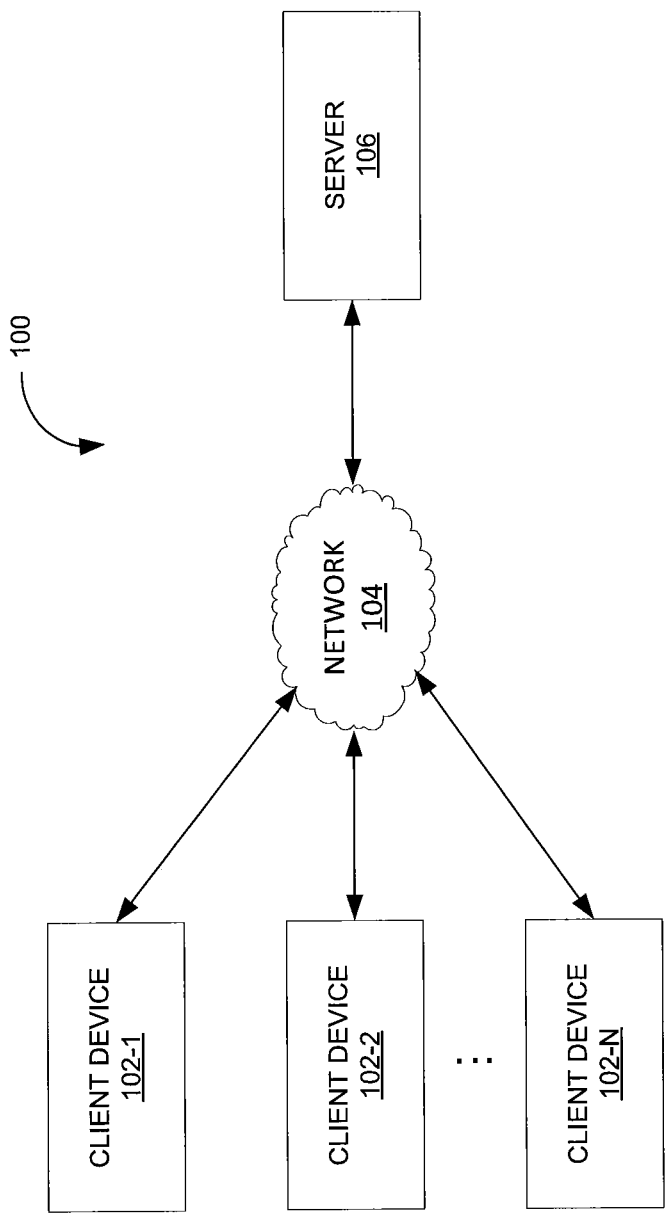
FIG. 1 illustrates a system configured to implement one or more aspects of the present invention.

FIG. 1 illustrates a system 100 configured to implement one or more aspects of the present invention. As shown, the system 100 includes, without limitation, one or more client devices 102 configured to transmit data to and receive data from a server 106 through a network 104. More specifically, as discussed in greater detail below in conjunction with FIG. 2, each client device 102 executes at least one software application and a user activity engine. The user activity engine tracks one or more different software applications that are executed on a particular client device 102 and, with respect to a given software application, tracks the commands issued by a user of the software application when interacting with that software application to create a work product. For example, if the software application were a computer-aided design (CAD) software application, then the user activity engine would be configured to track the different commands issued by a user when interacting with the CAD software application to generate a design. The user activity engine then transmits to the server 106 data specifying the application type, specifying the commands issued by the user, specifying the particular characteristics of the user's work product modified by those commands, and/or specifying the times at which the various commands were issued by the user.

The server 106 is configured to accumulate this data from each client device 102 and store the data in a user activity database. As is also described in greater detail below in conjunction with FIG. 2, the server 106 further executes an activity correlation engine, which processes data stored in the user activity database to identify the software application being executed and the commands being issued by each user. The activity correlation engine is further configured to sort and/or match users based on correlation criteria, for example, based on the type of software application being executed by a user, the commands being issued by the user within the software application, and the particular characteristics of the user's work product modified by those commands. For example, the activity correlation engine may identify that two or more users are issuing the same command within the same CAD software application. The activity correlation engine may then facilitate a connection between the users.

The client device 102 may be any type of electronic device that enables a user to connect to (e.g., via the Internet, a local area network (LAN), an ad hoc network, etc.) and communicate with one or more other users. Exemplary electronic devices include, without limitation, desktop computing devices, portable or hand-held computing devices, laptops, tablets, smartphones, mobile phones, personal digital assistants (PDAs), etc. In one embodiment, at least one client device 102 may be configured to provide the functionality of the server 106, thereby eliminating the necessity of a separate and dedicated server 106. In such an embodiment, the activity correlation engine that resides in the server 106, as described below in conjunction with FIG. 2, may instead reside within one or more client devices 102, and the different client devices 102 of FIG. 1 may communicate directly with each other, for example, via a peer-to-peer protocol.

Figure 2:
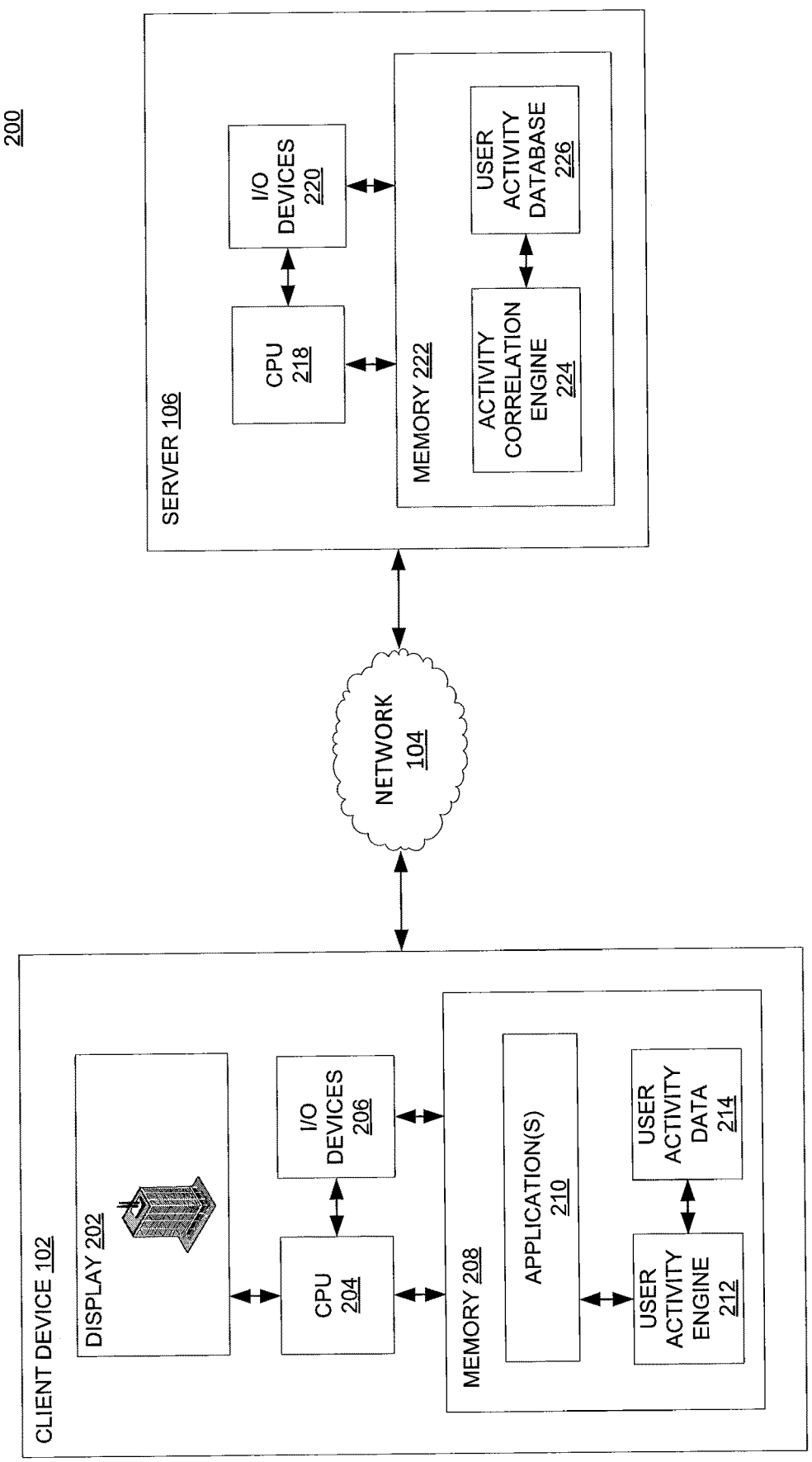
FIG. 2 sets forth more detailed illustrations of one of the client devices and the server of FIG. 1, according to one embodiment of the invention.

FIG. 2 sets forth more detailed illustrations of one of the client devices 102 and the server 106 of FIG. 1, according to one embodiment of the invention. As shown, the client device 102 includes, without limitation, a display 202, a central processing unit (CPU) 204, one or more input/output (I/O) devices 206, and a memory 208. The memory 208 is configured to store software application(s) 210, a user activity engine 212, and user activity data 214. The CPU 204 is configured to execute the software application(s) 210 and user activity engine 212. The software application 210 may be any type of software application. However, in the exemplary embodiment described herein, the software application 210 is a computer-aided design (CAD) application. A user of the CAD application may issue commands through an I/O device 206, for example, in order to prepare or modify design documents associated with the CAD application. The user activity engine 212 tracks the commands issued by the user within the CAD application, contextual information specifying the particular characteristics of the design document modified by those commands, and/or the times at which the various commands were issued by the user. The user activity engine 212 then stores this information within an "activity data element" included within the user activity data 214 module as described below in conjunction with FIG. 3. The activity data element is further transmitted through the network 104 to the server 106, where the activity data element is stored in the user activity database 226.

Although FIG. 2 shows the user activity engine 212 as a separate software module, it is also contemplated that the user activity engine 212 may be integrated into the software application 210 or offered as a software add-on or plug-in for the application 210. When configured as a separate software module, the user activity engine 212 may be capable of communicating with and receiving information from a variety of different software applications 210.

As also shown, the server 106 includes, without limitation, a central processing unit (CPU) 218, one or more input/output (I/O) devices 220, and a memory 222. The memory 222 is configured to store an activity correlation engine 224 and a user activity database 226. The CPU 218 is configured to execute the activity correlation engine 224, which receives user activity data including one or more activity data elements from the client devices 102 and stores data corresponding to the activity data elements in the user activity database 226. The activity correlation engine 226 further processes the activity data elements to, for example, identify the application being executed and commands being issued by one or more users. Processing may further include sorting and matching users based on correlation criteria, such as the type of software application being executed by a user, the commands being issued by the user within the software application, and the particular characteristics of the user's work product modified by those commands. The activity correlation engine 224 may then establish or facilitate a connection between two or more client devices 102 based on the type of application or command being issued by the users and/or the context in which a command is being issued by the users. For example, the activity correlation engine 224 may facilitate a connection between two or more client devices 102 by providing one or more of the client devices 102 with a listing of peers which match certain correlation criteria.

The activity correlation engine 224 also may facilitate a connection between users of one or more client devices 102 in response to a query issued by one or more users. For example, a first user may submit a query to the server 106 via an I/O device 206. The query may include, without limitation, a request for a listing of the application(s) or command(s) being used or previously used by one or more other users, a question regarding a particular application function or command, or a request to establish a connection with a particular user or type of user. In response to the query, the activity correlation engine 224 may provide information to the first user, such as information contained within another user's activity data element(s), or the activity correlation engine 224 may connect the first user to one or more other users based on certain correlation criteria, such as whether another user is currently using or has previously used an application or command at issue. Additionally, the activity correlation engine 224 may take into account other correlation criteria when facilitating a connection between users, such as the degree of experience a user has with a particular application or command, the number of times a user has executed an application, the number of times a user has issued a command, the particular characteristics of the user's work product, the rating that other users have previously giving a user, the physical location of a user, the language(s) in which a user is proficient, and/or other relevant user credentials.

As discussed above, the activity correlation engine 224 may establish or facilitate a connection between two or more client devices 102 based on contextual information specifying the particular characteristics of two or more users or of a document being modified by the users. Such contextual information may include, without limitation, information such as the type of computer-aided design document (e.g., architectural, automotive, aerospace, landscape, or a subcategory thereof) being modified by a user, the unique combination(s) of commands frequently executed by a user, the unique sequence(s) in which a user issued two or more commands, the set(s) of parameters selected by a user for a particular command or function, and/or characteristics of the hardware/software configuration with which a user is modifying a document. Any number of these and other contextual factors may be used to determine whether to establish or facilitate a connection between two or more users.

Establishing a connection between client devices 102 may include, for example, initiating a communication protocol, such as a text-based protocol, instant messaging protocol, or video conferencing protocol, and/or enabling a user to remotely control a client device 102, for example, in order to enable a remote user to demonstrate an application command or function. In various embodiments, a connection between client devices 102 may be established over the network 104 or through an ad hoc or peer-to-peer connection between the client devices 102.

Figure 3:
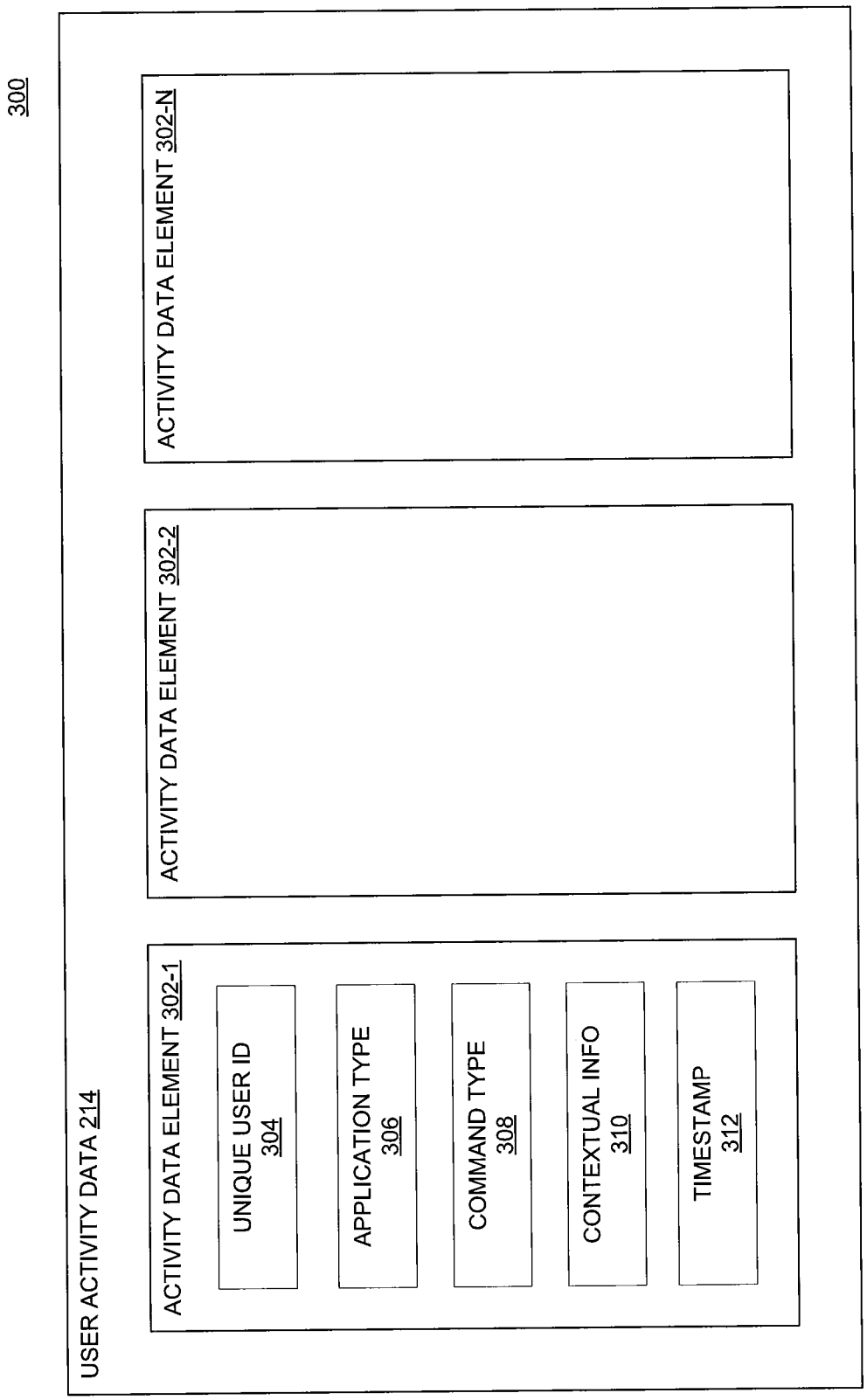
FIG. 3 sets forth a more detailed illustration of exemplary user activity data of FIG. 2, according to one embodiment of the invention.

FIG. 3 sets forth a more detailed illustration of exemplary user activity data 214 of FIG. 2, according to one embodiment of the invention. The user activity data 214 includes one or more activity data elements 302, each of which are configured to store information related to activities performed by one or more users. For example, activity data element 302-1 includes information such as, without limitation, a unique user identification (ID) 304, an application type 306, a command type 308, contextual information 310, and one or more timestamps 312.

The unique user ID 304 field may include a string of numbers, letters, and/or characters that is unique to a particular client device 102 or user. The unique user ID 304 is used to identify the user(s) or client device(s) 102 by which or for which an activity data element 302 was created or modified. The application type 306 field includes information describing the software application(s) used by a particular user or client device 102. For example, the application type 306 may indicate that a particular user or client device 102 was executing a specific CAD software application. The command type 308 field includes information describing the command(s) being executed by, or previously executed by, a user or client device 102. For example, the command type 308 may indicate that a spline command is being issued by a user or client device 102. The contextual information 310 field may include, without limitation, information such as the type of document being modified by a user, the unique combination of commands frequently executed by a user, the unique sequence in which a user issued two or more commands, the set of parameters selected by a user for a particular command or function, and/or characteristics of the hardware/software configuration with which a user is modifying a document. For example, if a user is executing a CAD software application, the contextual information 310 field may indicate that the CAD document being modified by the user includes an architectural drawing, an automotive drawing, an aerospace drawing, a landscape, etc. The timestamp 312 field indicates when a particular user activity occurred. For example, the timestamp 312 field may indicate when a user executed a software application, issued a command, established a connection with another user, logged into a network, logged out of a network, etc.

Figure 4:
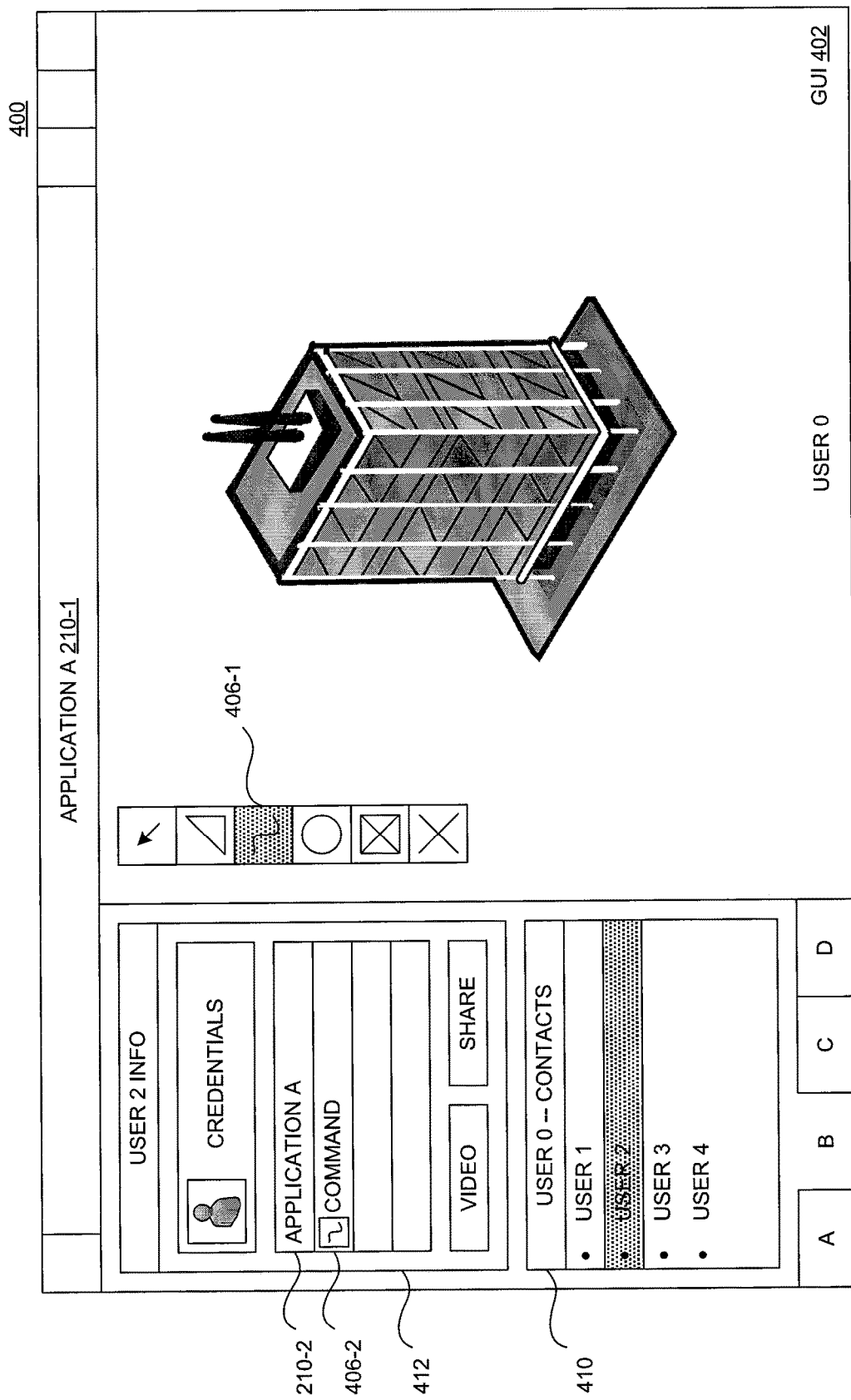
FIG. 4 illustrates a software application executing on one of the client devices of FIG. 2, according to one embodiment of the invention.

FIG. 4 illustrates a software application 210-1 executing on one of the client devices 102 of FIG. 2, according to one embodiment of the invention. As shown, the software application 210-1 includes a graphical user interface (GUI) 402, which allows a user to interact with the software application 210-1 and user activity engine 212. The GUI 402 further enables the user to interact with the user activity engine 212 in order to view and/or modify information received from or transmitted to the activity correlation engine 224. Although the user activity engine 212 and activity correlation engine 224 are described in conjunction with the GUI 402 illustrated in FIG. 4, persons skilled in the art will understand that other implementations of the user activity engine 212 and activity correlation engine 224 are within the scope of the invention.

As shown in FIG. 4, the GUI 402 allows a user to select from a variety of commands 406 for modifying a document. The GUI 402 also allows the user to select from a variety of collaboration functions 408 in order to connect to and communicate with other users. For example, collaboration function 408 enables a user to view the profile and activity status of other users via a user information window 412 and a peer list 410.

The user information window 412 may include information regarding a particular user's profile and activities. Examples of user credentials include, without limitation, the company or companies with which the user has been employed, the degree of training or experience of a user with regard to a particular activity, and a cumulative rating of the user based on peer feedback, correlation criteria, etc. Examples of user activities include, without limitation, the type(s) of application(s) the user is executing or has previously executed and the type(s) of command(s) the user is issuing or has previously issued. As shown in FIG. 4, the exemplary user information window 412 indicates that User 2 is executing Application A 210-2 and is issuing spline command 406-2. The user information window 412 also may display a timestamp indicating when a particular activity took place.

The peer list 410 may display a user's selected and/or suggested contacts. For example, as shown in FIG. 4, User 0 may select a user from the peer list 410 in order to view information regarding the user's credentials and activities, as described above. Once selected, User 0 may further establish a connection (e.g., textual, voice, video, etc.) with the selected user and/or may share documents, Internet links, images, etc. with the selected user.

Figure 5:
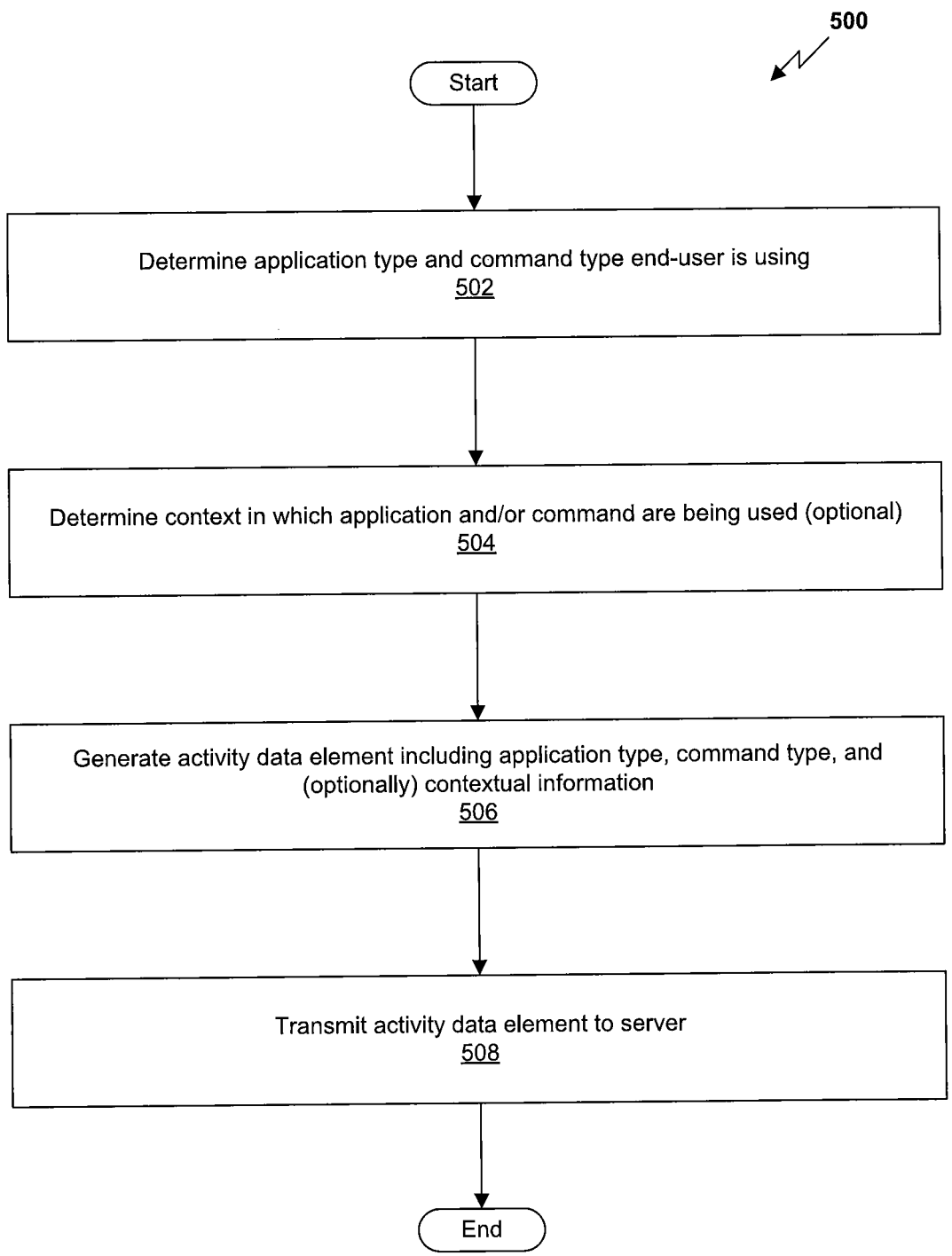
FIG. 5 is a flow diagram of method steps for tracking the activity of a user of a software application, according to one embodiment of the present invention.

FIG. 5 is a flow diagram of method steps for tracking the activity of a user of a software application, according to one embodiment of the present invention. Although the method steps are described in conjunction with FIGS. 1-4, persons skilled in the art will understand that any system configured to perform the method steps, in any order, falls within the scope of the present invention.

As shown, a method 500 begins at step 502, where the CPU 204 executes the user activity engine 212 to determine the type of application being executed by a user and the type(s) of command(s) the user is issuing to the application. At step 504, the user activity engine 212 optionally determines the context in which the application is being executed and/or the context in which the command is being issued. At step 506, the user activity engine 212 generates an activity data element 302 and stores within the activity data element 302 data indicating the type of application being executed by the user, the type of command being issued by the user, and optional contextual information. The activity data element 302 is then stored in the user activity data 214 in memory 208.

In one exemplary implementation of the method steps of FIG. 5, the user activity engine 212 may determine that User 0 is executing Application A 210-1, and that the user is issuing a spline command 406-1 to Application A 210-1, as shown in FIG. 4. The user activity engine 212 then may optionally determine the context in which the user is issuing the spline command 406-1. Such contextual information may include, for example, the frequency with which the user has issued the spline command, which commands were issued prior to the spline command, which commands are issued after the spline command, the parameters specified by the user when issuing the spline command (e.g., line width, curvature, number of inflection points, etc.), and whether the user frequently issues the spline command in conjunction with other types of commands. Additional types of contextual information may include application parameters specified by the user or other characteristics of a particular document which indicate the type of drawing being modified by the user. For example, the user activity engine 212 may analyze various parameters to determine that User 0 is executing Application A 210-1 and issuing a spline command 406-1 to modify an architectural drawing. The user activity engine 212 then stores, in an activity data element 302, data indicating that Application A 210-1 is being executed by the user and that the spline command 406-1 is being issued by the user. Optionally, the user activity engine 212 also may store contextual information in the activity data element 302, for example, information indicating that the user is modifying an architectural drawing.

At step 508, the activity data element 302 is transmitted from the client device 102 to the server 106. The activity data element 302 may then be received and processed by the activity correlation engine 224 and/or stored in the user activity database 226 in memory 222. Transmission of the activity data element 302 may take place by any means of communication, such as over a network (e.g., the Internet, a local area network (LAN), etc.) or through a peer-to-peer or ad hoc connection.

As discussed above in conjunction with FIG. 1, one or more of the client devices 102 may perform the functions of the server 106, thereby eliminating the necessity of a separate and dedicated server 106. In such embodiment, the activity data element 302 may be transmitted from a first client device 102-1 to a second client device 102-2 which is acting as a server and which includes an activity correlation engine 224. In yet another embodiment, the user activity engine 212 and activity correlation engine 224 may be implemented in a cloud computing-type of configuration. In such a configuration, the client devices 102 may act as terminal devices, and the server 106 may execute both the user activity engine 212 and activity correlation engine 224. One or more user activity engines 212 may track the activities of one or more users and transmit the resulting activity data elements 302 to the activity correlation engine 224, which may reside on the same server 106 as the user activity engine 212 or on a different server 106 than the user activity engine 212.

Figure 6:
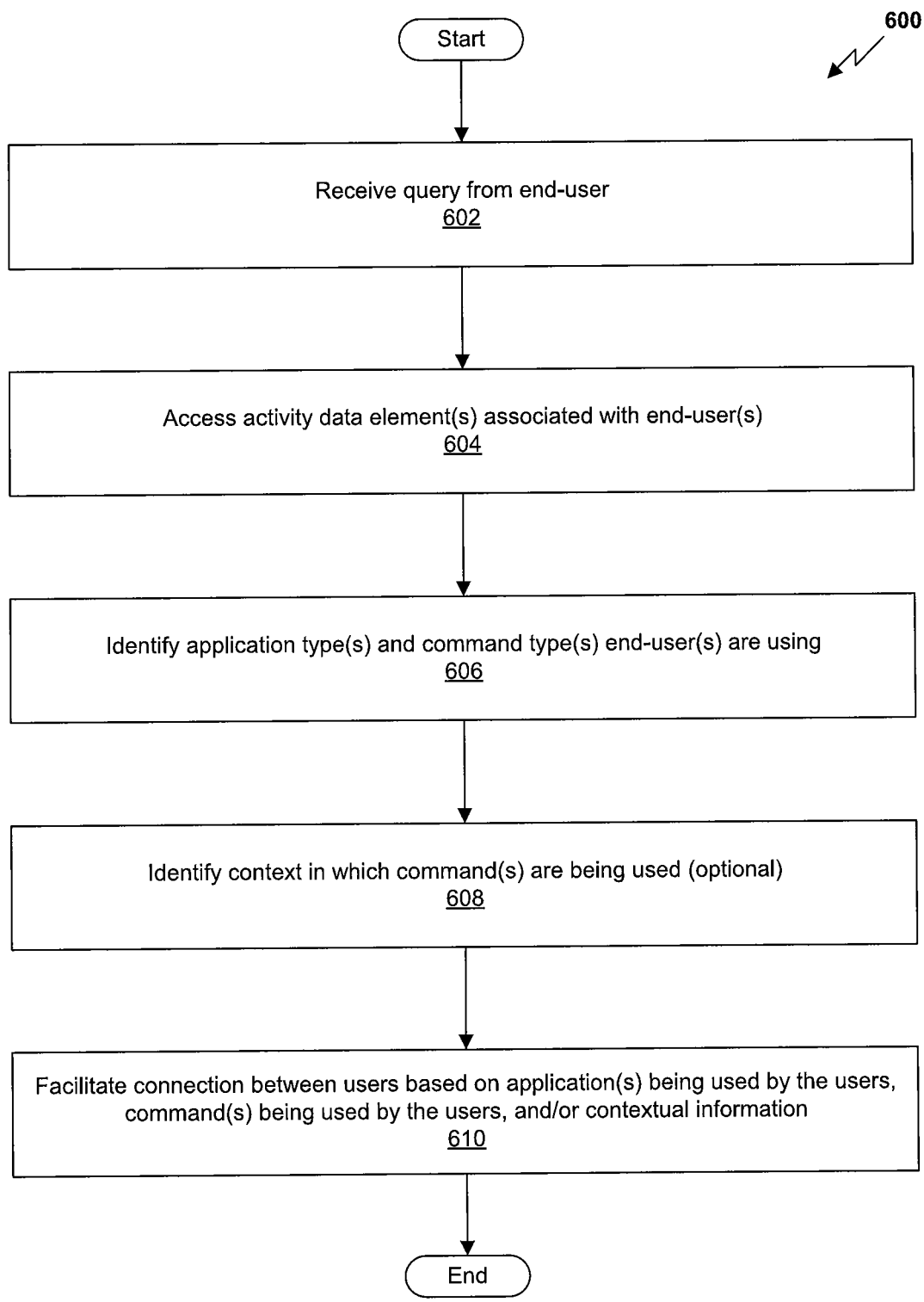
FIG. 6 is a flow diagram of method steps for facilitating a connection between users based on one or more correlation criteria, according to one embodiment of the present invention.

FIG. 6 is a flow diagram of method steps for facilitating a connection between users based on one or more correlation criteria, according to one embodiment of the present invention. Although the method steps are described in conjunction with FIGS. 1-4, persons skilled in the art will understand that any system configured to perform the method steps, in any order, falls within the scope of the present invention.

The method begins at step 602, where the CPU 218 executes the activity correlation engine 224 and receives a query from a first user. The query may include, for example, a request for information about a second user, a request to connect to a second user, and/or an application- or command-specific question. At step 604, the activity correlation engine 224 accesses a first activity data element 302 associated with the first user and a second activity data element 302 associated with the second user from the user activity database 226. At step 606, the activity correlation engine 224 analyzes the activity data elements 302 to identify the types of application being executed by the first and second users and/or the types of command being issued by the first and second users. At step 608, the activity correlation engine 224 may optionally analyze correlation information included in the activity data element(s) 302 to determine the context in which an application is being executed and/or the context in which a command is being issued. At step 610, the activity correlation engine 224 then facilitates a connection between the first and second users based on a measure of correlation between the activity data element(s) 302. For example, the activity correlation engine 224 may match users based on the type of application being executed by the users and/or the type of command being issued by the users. Additionally, the activity correlation engine 224 may search the user activity database 226 for other users who submitted similar application- or command-specific questions. The activity correlation engine 224 may then use the search results to match one or more users, enabling the users to collaborate to resolve the application- or command-specific issue.

In one exemplary implementation of the method steps of FIG. 6, a user may submit a query to the activity correlation engine 224 requesting a listing of one or more users who are executing a spline command 406-1 to Application A 210-1. In addition, the user may submit to the activity correlation engine 224 a specific question regarding the spline command 406-1 or Application A 210-1, such as a question relating to the operation of the spline command 406-1 or an issue encountered by the user when attempting to issue the spline command 406-1. In response, the activity correlation engine 224 may process one or more activity data elements 302 stored in the user activity database 226 to generate a listing of one or more users who are executing the spline command 406-1 in Application A 210-1. Optionally, the activity correlation engine 224 may further identify the context in which the user(s) are executing the spline command 406-1, such as whether the user(s) are executing the command to modify an architectural drawing (or a specific sub-category of architectural drawings). Additionally, the activity correlation engine 224 may search the user activity database 226 for other users who submitted similar application- or command-specific questions.

Next, the activity correlation engine 224 may return peer list 410 to the user indicating which users match one or more criteria of the query. Finally, the activity correlation engine 224 may facilitate a connection between the user and one or more other users based on the correlation criteria, enabling users to provide assistance to one another or collaborate to resolve application- or command-specific issues.

In sum, a user activity engine determines the application type and/or command being used by an end-user and stores this information in an activity data element. The activity data element is then transmitted to a server. An activity correlation engine in the server accesses the activity data element, identifies the application type and/or command being used by the end-user, and facilitates a connection between the end-user and one or more other end-users that are using the same application type and/or command.

One advantage of the techniques described herein is that the user of an application is able to quickly and easily connect to a community of other users who are using an application in the same or a similar context. Once connected, experienced users can assist others in performing specific tasks, or users who have encountered a similar problem can collaborate to find a solution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for facilitating a connection between users, the method comprising:
   receiving a first activity data element associated with a first user, wherein the first activity data element comprises activity information associated with a first software application, and the first activity data element includes one or more characteristics of at least a first document that have been modified by the first user via the first software application;
   receiving a second activity data element associated with a second user, wherein the second activity data element comprises activity information associated with the first software application, and the second activity data element includes one or more characteristics of at least one of the first document or a second document that have been modified by the second user via the first software application;
   determining, via a processing unit, that a connection between the first user and the second user should be facilitated in response to determining, based on a measure of correlation, that the one or more characteristics of the at least the first document that have been modified by the first user are correlated with the one or more characteristics of the at least one of the first document or the second document that have been modified by the second user, wherein the measure of correlation is determined by comparing at least one of contextual information included in the first and second activity data elements or one or more types of commands issued by the first and second users; and
   in response, facilitating a connection between the first user and the second user.

2. The computer-implemented method of claim 1, wherein the activity information associated with the first software application comprises one or more types of commands issued by the first and second users.

3. The computer-implemented method of claim 1, wherein the activity information associated with the first software application comprises contextual information associated with the first software application.

4. The computer-implemented method of claim 3, wherein the contextual information comprises a type of document modified by the first and second users, a sequence of commands issued by the first and second users, or a parameter set by the first and second users.

5. The computer-implemented method of claim 1, further comprising:
   storing the first and second activity data elements in a database; and
   querying the database to identify activity information associated with the first software application.

6. The computer-implemented method of claim 1, further comprising:
   storing the measure of correlation in a database; and
   querying the database to identify the measure of correlation.

7. The computer-implemented method of claim 1, further comprising:
   receiving a query from the first user; and
   providing a listing of one or more other users based on another measure of correlation between the first activity data element and one or more other activity data elements.

8. The computer-implemented method of claim 7, wherein the query specifies a type of command issued by the first user or contextual information associated with the first software application.

9. The computer-implemented method of claim 1, further comprising:
   receiving a third activity data element associated with a third user, the third activity data element comprising activity information associated with a second software application;
   receiving a fourth activity data element associated with a fourth user, the fourth activity data element comprising activity information associated with the second software application;

determining one or more measures of correlation between the first, second, third, and fourth activity data elements;

based on the one or more measures of correlation, determining that a connection between the third user and the fourth user should be facilitated; and facilitating a connection between the third user and the fourth user.

10. One or more non-transitory computer-readable storage media including instructions that, when executed by one or more processing units, cause the one or more processing units to facilitate a connection between users, by performing the steps of:

receiving a first activity data element associated with a first user, wherein the first activity data element comprises activity information associated with a first software application, and the first activity data element includes one or more characteristics of at least a first document that have been modified by the first user via the first software application;

receiving a second activity data element associated with a second user, wherein the second activity data element comprises activity information associated with the first software application, and the second activity data element includes one or more characteristics of at least one of the first document or a second document that have been modified by the second user via the first software application;

determining that a connection between the first user and the second user should be facilitated in response to determining, based on a measure of correlation, that the one or more characteristics of the at least the first document that have been modified by the first user are correlated with the one or more characteristics of the at least one of the first document and the second document that have been modified by the second user, wherein the measure of correlation is determined by comparing at least one of contextual information included in the first and second activity data elements or one or more types of commands issued by the first and second users; and in response, facilitating a connection between the first user and the second user.

11. The one or more non-transitory computer-readable storage media of claim 10, wherein the activity information associated with the first software application comprises one or more types of commands issued by the first and second users.

12. The one or more non-transitory computer-readable storage media of claim 10, wherein the activity information associated with the first software application comprises contextual information associated with the first software application.

13. The one or more non-transitory computer-readable storage media of claim 12, wherein the contextual information comprises a type of document modified by the first and second users, a sequence of commands issued by the first and second users, or a parameter set by the first and second users.

14. The one or more non-transitory computer-readable storage media of claim 10, further comprising:

storing the first and second activity data elements in a database; and querying the database to identify activity information associated with the first software application.

15. The one or more non-transitory computer-readable storage media of claim 10, further comprising:

storing the measure of correlation in a database; and querying the database to identify the measure of correlation.

16. The one or more non-transitory computer-readable storage media of claim 10, further comprising:

receiving a query from the first user; and providing a listing of one or more other users based on another measure of correlation between the first activity data element and one or more other activity data elements.

17. The one or more non-transitory computer-readable storage media of claim 16, wherein the query specifies a type of command issued by the first user or contextual information associated with the first software application.

18. The one or more non-transitory computer-readable storage media of claim 10, further comprising:

receiving a third activity data element associated with a third user, the third activity data element comprising activity information associated with a second software application;

receiving a fourth activity data element associated with a fourth user, the fourth activity data element comprising activity information associated with the second software application;

determining one or more measures of correlation between the first, second, third, and fourth activity data elements;

based on the one or more measures of correlation, determining that a connection between the third user and the fourth user should be facilitated; and facilitating a connection between the third user and the fourth user.

19. A computing device, comprising:

one or more memories including instructions; and one or more processors that are coupled to the one or more memories and, when executing the instructions, are configured to:

receive a first activity data element associated with a first user, wherein the first activity data element comprises activity information associated with a first software application, and the first activity data element includes one or more characteristics of at least a first document that have been modified by the first user via the first software application;

receive a second activity data element associated with a second user, wherein the second activity data element comprises activity information associated with the first software application, and the second activity data element includes one or more characteristics of at least one of the first document and a second document that have been modified by the second user via the first software application;

determine that a connection between the first user and the second user should be facilitated in response to determining, based on a measure of correlation, that the one or more characteristics of the at least the first document that have been modified by the first user are correlated with the one or more characteristics of the at least one of the first document or the second document that have been modified by the second user, wherein the measure of correlation is determined by comparing at least one of contextual information included in the first and second activity data elements or one or more types of commands issued by the first and second users; and in response, facilitate a connection between the first user and the second user.

20. The computing device of claim 19, wherein the activity information associated with the first software application comprises one or more types of commands issued by the first and second users.

21. The computer-implemented method of claim 1, wherein the first activity data element further includes a sequence of commands issued by the first user.

* * * * *